US006765312B1

(12) United States Patent
Urlass et al.

(10) Patent No.: US 6,765,312 B1
(45) Date of Patent: Jul. 20, 2004

(54) DUAL BATTERY SYSTEM

(75) Inventors: Thorsten Urlass, Tuelau (DE); Klaus Revermann, Lehre (DE); Marco Baumgarth, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 60 days.

(21) Appl. No.: 10/130,201

(22) PCT Filed: Nov. 13, 2000

(86) PCT No.: PCT/EP00/11215

§ 371 (c)(1),
(2), (4) Date: Sep. 26, 2002

(87) PCT Pub. No.: WO01/36232

PCT Pub. Date: May 25, 2001

(30) Foreign Application Priority Data

Nov. 15, 1999 (DE) .......................... 199 55 721

(51) Int. Cl.[7] ................................. H02J 1/10
(52) U.S. Cl. .................... 307/10.1; 307/23; 307/44
(58) Field of Search .................... 307/10.1, 18, 19, 307/20, 21, 23, 38, 44, 64, 66

(56) References Cited

U.S. PATENT DOCUMENTS 5,977,652 A  * 11/1999  Frey et al. ................. 307/10.1
6,232,674 B1 *  5/2001  Frey et al. ................. 307/10.1
6,320,358 B2 * 11/2001  Miller ....................... 307/10.1

FOREIGN PATENT DOCUMENTS

| DE | 24 39 533 | 8/1976 |
| DE | 30 07 941 | 9/1981 |
| DE | 38 41 769 | 6/1990 |
| DE | 40 28 242 | 3/1992 |
| DE | 42 11 578 | 4/1993 |
| DE | 196 28 222 | 1/1998 |
| DE | 196 45 944 | 5/1998 |
| DE | 196 51 612 | 6/1998 |
| DE | 197 06 946 | 8/1998 |
| FR | 2 739 733 | 4/1997 |
| FR | 2 749 814 | 12/1997 |

* cited by examiner

Primary Examiner—Jessica Han
(74) Attorney, Agent, or Firm—Kenyon & Kenyon

(57) ABSTRACT

A dual battery system includes a starter battery and a battery of the vehicle electric system, a starter and electric consumers that are divided up into start-relevant consumers and consumers of the vehicle electric system. At least one starter switch is interposed between the starter and the starter battery. A first, electronically fully locking switch element is interposed between the starter battery and the start-relevant consumers and a second electrically fully locking switch element is interposed between the battery of the vehicle electric system and the start-relevant consumers. An element is interposed between the starter battery and the battery of the vehicle electric system that prevents the flow of current from the starter battery to the battery of the vehicle electric system and the consumers of the vehicle electric system.

15 Claims, 3 Drawing Sheets

DUAL BATTERY SYSTEM

FIELD OF THE INVENTION

The present invention relates to a two-battery system and a method for controlling the two-battery system.

BACKGROUND INFORMATION

Such a two-battery system having a vehicle electrical-system battery and a starter battery, which are interconnected when the generator is running, is described in German Published Patent Application No. 38 41 769. In the case in which a small amount of current is being supplied by the generator, this has the disadvantage of the electrical-system battery being charged at the expense of the starter battery, due to charge equalization, when the state of charge of the electrical-system battery is worse than that of the starter battery. In the conventional vehicle electrical system, a switch is also installed between the electrical-system battery having the electrical-system loads, and the remaining part of the vehicle electrical system, the switch being opened in response to the generator shutting down, as soon as the starter-battery voltage falls below a permissible limiting value. This measure only protects the starter battery from being completely discharged when the generator is stopped, and it also allows the starter battery to be partially discharged. This poor initial condition increases the load on the starter battery at the beginning of the trip, when the charge of the two batteries is equalized at the expense of the starter battery. In the extreme case, this can result in the complete discharge or destruction of the starter battery.

A two-battery system is described in German Published Patent Application No. 40 28 242, where the connection between the starter battery and the electrical-system battery can be opened, when the electrical-system battery would otherwise be charged by the starter battery. The two batteries are connected to each other, when the voltage of the electrical-system battery is greater than the starter-battery voltage. If the voltage of the electrical-system battery is less than that of the starter battery, then the two batteries are disconnected from each other. The separation can be performed in various ways, e.g. by disconnecting the starter battery from the rest of the vehicle electrical system. In this manner, the starter battery is not loaded by a discharged electrical-system battery, and, in the working mode, the generator can power the most important consumers and simultaneously charge the electrical-system battery. The two batteries can also be disconnected from the rest of the vehicle electrical system by switching off the electrical-system battery. The starter battery can then be charged, when the generator and the starter battery are connected.

When space is limited, the positioning of the starter battery in the motor vehicle is a general problem in two-battery systems. In order to reduce the fire hazard from electrical short-circuiting during accidents, the starter line, which electrically connects the starter to the starter battery in a permanent manner, must be laid through impact-resistant zones in the motor vehicle. This also applies to the starter line in single-battery systems. As an alternative, pyrotechnic battery terminals may be used, which are irreversibly severed from the batteries in an explosive manner prior to or during an accident, and thus interrupt the flow of electric current. In this context, the firing control of the pyrotechnic terminals is mostly performed by a precrash sensory system, which, e.g., evaluates the signals of an airbag control unit. In addition to their high cost, the complex firing control of the pyrotechnic terminals is disadvantageous, since inadvertent triggering must be prevented or the motor vehicle can no longer be started. The irreversibility is generally disadvantageous, since the terminals must be replaced after each instance of triggering.

Therefore, it is an object of the present invention to provide a two-battery system and a method for controlling the system, which permit simple starter management and charge management for the starter battery. It is another object of the present invention to provide a simple and cost-effective reduction of the fire hazard.

SUMMARY

The above and other beneficial objects are achieved by providing a two-battery system and a method as described herein.

To this end, a first, electrically fully-blocking switch element is arranged between the start-relevant load circuits and the starter battery, and a second, electrically fully-blocking switch element is arranged between the electrical-system battery and the start-relevant consumers. An element that blocks current from flowing from the starter battery to the electrical-system battery and the electrical-system consumers are arranged between the starter battery and the electrical-system battery. Using the switch elements, the start-relevant consumers may be positioned on alternate sides of the starter battery or the electrical-system battery, while the element prevents the starter battery from being discharged by a discharged electrical-system battery. Electrically fully-blocking means that no significant current may flow through the switch element in the open or blocked state. In particular, this includes all indirect-coupled, direct-connected or direct connecting switches such as relays. However, simple power MOSFET's may not be suited for this purpose, since they may not be completely blocked, due to a technologically necessary, parasitic diode. However, two power MOSFET's connected back-to-back may principally be used as a switch element, since the reverse diode currents are negligible.

The element between the starter battery and the electrical-system battery may take the form of an automatically controlled, self-regulating, diode or a controllable switch or relay.

When at least one electronic pole terminal, by which the starter line may be switched off-circuit, is positioned between the starter and the starter battery in a two-battery system, the starter line, which is normally off-circuit, may be arbitrarily positioned in the motor vehicle, without representing a fire hazard. This increases the degree of freedom in the wiring, since space restrictions are largely eliminated. To this end, the electric pole terminal is only switched through in the actual starting phase and is otherwise operated in the off state. In two-battery systems, depending on the further circuit diagram, it may be ensured that, if the electrical-system battery is directly connected to the starter or may be connected to the starter to support the starting operation, the electrical-system battery may also be disconnected from the starter line by an electronic pole terminal, so that the de-energized state of the starter line is ensured. In this context, the electronic pole terminals may be of the same kind or may be configured differently, depending on the circuit layout. Another advantage is that, in the standing phase, the electronic pole terminals disconnect the starter battery, along with the consumers relevant for starting, from the rest of the vehicle electrical system, so that the starter battery may provide a sufficient starting capacity over long standing phases.

When an intended start is detected, the method provides for a start signal (terminal (50)-signal) being generated, by which the electronic pole terminals are switched through in the starting phase and blocked again after the start has occurred. If the motor vehicle is configured to have a mechanical ignition lock, then the terminal (50)-signal is directly generated by turning the ignition key, and the starting procedure is immediately initiated, if the starter battery and possibly the electrical-system battery may provide sufficient voltage. If, however, the motor vehicle is connected to an electronic ignition lock, then a start-enabling control device initially checks if the start-relevant consumers receive a sufficient supply voltage. If this is the case, then the start-enabling control device generates a terminal (50)-signal, and the electronic pole terminal of the starter battery, and possibly that of the electrical-system battery, are switched through, so that the starter line, which carries a voltage, supplies the starter with a starter voltage and starts the motor or engine. The electronic pole terminals are then blocked again, and the starter line is switched off-circuit. Regardless of the configuration of the ignition lock, it may be ensured that the starter line is only connected in circuit in the immediate starting phase, and is otherwise switched off-circuit.

In a further example embodiment, an additional electronic pole terminal is arranged between the starter and the electrical-system battery, the starter being able to be started by the electrical-system battery, via the additional electronic pole terminal, without the starter voltage being reduced by voltage drops across the element. In this example embodiment, the element may take the form of a relay.

In a further example embodiment, the high-load starting consumers, which are only active during the starting phase or a short time after the start has occurred, are permanently assigned to the starter battery, so that their current does not have to flow through the relays, and the relays may therefore be dimensioned to have a lower capacity and are less expensive.

The generator may be in the form of a controllable generator, which may adjust its voltage, using a controllable regulator. In this manner, the control unit triggering the relays may instruct the generator to adjust its output voltage to the starter-battery voltage, prior to a switching operation of the relays, so that high load currents do not have to be directed in the switching operation.

The electronic pole terminals may be in the form of switchable power semiconductors, by which appropriately large amperages may be switched, using small control currents. In a further example embodiment, the electronic pole terminal may take the form of a CMOS-FET, so that an electrical power loss essentially occurs only in the switching operations. In order to generate appropriate gate voltages, the FET is configured with a charge pump, which functions up to an electrical-system voltage of, e.g. 3 V, and builds up the appropriate gate voltage. However, the closed-circuit current through the CMOS-FET may be neglected in the stationary case, so that the batteries are not loaded. In the switched-through state, such CMOS-FET's have a contact resistance of 0.5 to 0.6 mΩ, so that the voltage drop at 1200 A is only 0.6 to 0.72 V. In the case of cold starting, the resistance is only approximately 0.4 mΩ, so that the voltage drop is 0.48 V. Therefore, almost all of the battery voltage is available to the starter.

When the starter battery is discharged, the electronic pole terminal between the starter and the starter battery prevents an external start from occurring any longer in the engine compartment. To this end, the starter battery is assigned a tap, e.g., in the form of a busbar, which may then connect an external battery to the starter battery. This tap constitutes an external-start aiding point, which may be arranged at an arbitrary location in the motor vehicle, but, e.g., in the direct vicinity of the starter battery.

DETAILED DESCRIPTION

Figure 1:
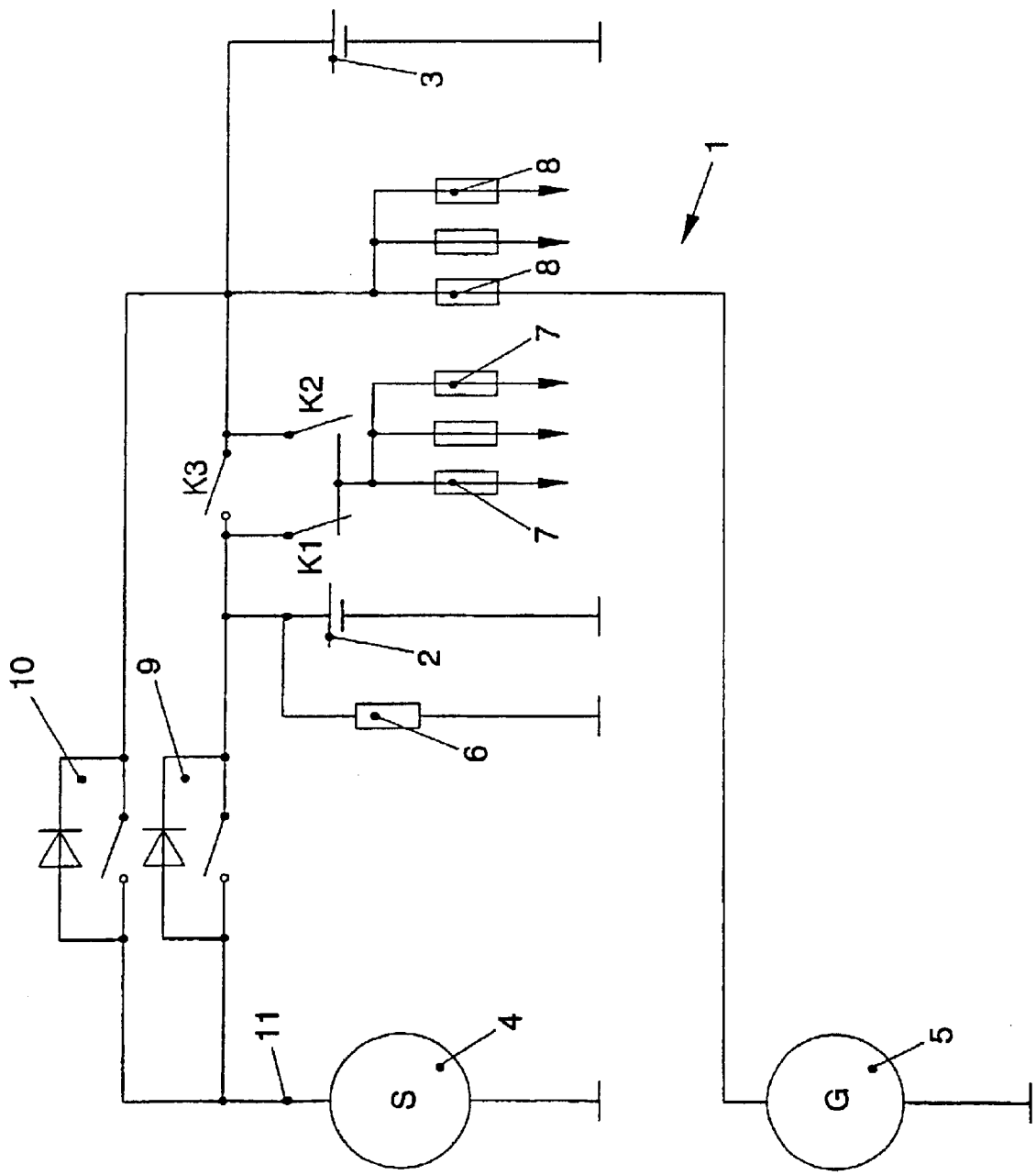
FIG. 1 is a schematic circuit diagram of a two-battery system having two electronic pole terminals.

A schematic circuit diagram of a two-battery system 1 is illustrated in FIG. 1. Two-battery system 1 includes a starter battery 2, an electrical-system battery 3, a starter 4, a generator 5, high-load starting consumers 6, start-relevant consumers 7, electrical-system consumers 8, two electronic pole terminals 9, 10, and three relays K1–K3. High-load starting consumers 6 are permanently connected to starter battery 2. In the same manner, electrical-system consumers 8 are permanently connected to electrical-system battery 3, and the electrical-system battery is permanently connected to generator 5. Start-relevant consumers 7 may be connected to starter battery 2 via a relay K1, and may be connected to electrical-system battery 3 via a relay K2. In addition, starter battery 2 and electrical-system battery 3 may be interconnected by a third relay K3, which is arranged between the two relays K1, K2. Relay K1 is in the form of a normally closed contact, i.e., in the release state, relay K1 is closed and start-relevant consumers 7 are therefore connected to starter battery 2. However, relays K2 and K3 take the form of normally open contacts, i.e., in the release state, starter battery 2 and start-relevant consumers 7 are separated from the electrical-system battery. Electronic pole terminal 9 is arranged between starter 4 and starter battery 2. Electronic pole terminal 9 may be in the form of a switchable, power semiconductor, in particular a CMOS power transistor.

This electronic pole terminal 9 has a very low resistance in the switched-through state, and a very high resistance in the blocked state, so that electronic pole terminal 9 is represented as an ideal switch. However, there is a technologically necessary parasitic diode that allows a parasitic or stray current to flow, which is why the polarity must be taken into account in the interconnection configuration. In FIG. 1, this parasitic diode is therefore illustrated in parallel with the ideal switch, which together form electronic pole terminal 9. The configurations of electronic pole terminal 9 also apply analogously to electronic pole terminal 10, which is arranged between starter 4 and electrical-system battery 3. The fact that high-load starting consumers 6 are permanently assigned to starter battery 2 may provide the advantage, that relay K1 may not have to carry the high current and, as such, may be dimensioned to be smaller or may have a lower rating. However, high-load starting consumers 6 may theoretically be switched through relay K1, when relay K1 is appropriately dimensioned.

Before the internal combustion engine is started, the two electronic pole terminals 9, 10 are open, and starter line 11 is therefore off-circuit. Relays K1–K3 are in the release state, so that start-relevant consumers 7 are connected to starter battery 2, and starter battery 2 and electrical-system battery 3 are disconnected from each other.

The connection of relays K1–K3 in the starting phase and operating phase is dependent on the charge of starter battery 2 and electrical system battery 3. These charge states and electrical-system states may be determined in various manners. In the simplest case, an electrical-system control unit, which obtains its information from data present in the electrical system, via a CAN bus, and from battery-voltage measurements, assumes this task.

Thus, the battery charges are first measured prior to the starting phase. If this test reveals that the charge of starter battery 2 is sufficient for the starting operation, then relays K1–K3 remain in their neutral position. There are then two principal procedures for controlling starter 4. On one hand, the two electrical pole terminals 9, 10 may always be switched through, so that the voltage for starter 4 is supplied by both starter battery 2 and electrical-system battery 3. As an alternative, only electronic pole terminal 9 may normally be switched through, while electrical-system battery 3 is only switched on by electronic pole terminal 10 in the case of cold starting. However, it is theoretically possible to use just one battery or both batteries together for starting.

However, if the test of the battery charges reveals that the charge of the starter battery is not sufficient, because, e.g., too low a voltage or an already unsuccessful starting attempt was detected, then start-relevant consumers 7 may be powered by electrical-system battery 3. To this end, relay K2 may be closed and relay K1 may be opened. In this context, the order may be adhered to, in order that the start-relevant consumers, which also include control units, are not separated from the voltage supply for a short period of time. Relay K3 still remains open and is therefore not loaded by the high starting currents. The two electronic pole terminals 9, 10 are subsequently closed. In this case, electrical-system battery 3 supplies the operating voltage for starter 4 via electronic pole terminal 10, and supplies the supply voltage for high-load starting consumers 6 via switched-through electronic pole terminal 9. Theoretically, electronic pole terminal 9 may not have to be switched through for this purpose, since the parasitic diode is polarized in the forward direction. However, the current-carrying capacity of the parasitic diode or electronic pole terminal is generally not sufficient for high-load starting consumers 6. The two electronic pole terminals 9, 10 remain switched-through until high-load starting consumers 6 at starter battery 2 are no longer active.

After the starting procedure is terminated, it may be ensured that starter battery 2 is no longer loaded. The switching necessary for this is a function of how the starting procedure was implemented.

In the case of a starting procedure, in which the starter battery and possibly the electrical-system battery are used, the two electronic pole terminals 9, 10 are switched off after the starting procedure. Therefore, starter 4 and starter line 11 are switched off-circuit. A certain period of time may elapse before high-load starting consumers 6 at starter battery 2 have reduced their power output. After generator 5 is energized and has built-up charge for electrical-system battery 3, relays K2 and K3 may be closed. Relay K1 is then opened. It may be absolutely necessary that K2 is first closed, and then K1 is opened. This may be achieved by mechanical, electrical, and/or software-like or software-controlled locking. Using this switching operation, start-relevant consumers 7 are switched over to electrical-system battery 3, and starter battery 2 is charged via K3. If the electrical-system control unit now ascertains from a voltage measurement at starter battery 2, that the starter battery has been discharged by a highly-loaded electrical system, then K3 is opened, and the discharging is therefore prevented. The voltage measurement at electrical-system battery 3 allows the electrical-system control unit to in turn recognize, as of when the electrical system is no longer so highly loaded, and to then reconnect starter battery 2 for charging, using K3. The method for a starting procedure using electrical-system battery 3 is principally identical, except that the switchover of the start-relevant consumers to electrical-system battery 3 occurred prior to the starting procedure. However, the triggering of relay K3 is identical. After the internal combustion engine is turned off, all of the relays K1, K2, K3 are reset into their release state. Therefore, starter battery 2 is separated from the vehicle electrical system and may not be discharged by consumers in the standing phase.

A further refinement for controlling relays K1–3 is the use of a controllable generator 5. A generator 5 having a controllable controller may adjust its voltage. Therefore, if the output voltage of this generator 5 is predetermined by a control unit, it is possible to switch relay K3 with almost no load current. To this end, the same voltage is ideally selected for both sides of the relay. Starter battery 2 determines the one side, and the other side is accordingly adjusted by generator 5, the reduction in the generator output voltage being limited by the highest occurring battery voltage. Therefore, a large current may not flow during the switching phase.

Figure 2:
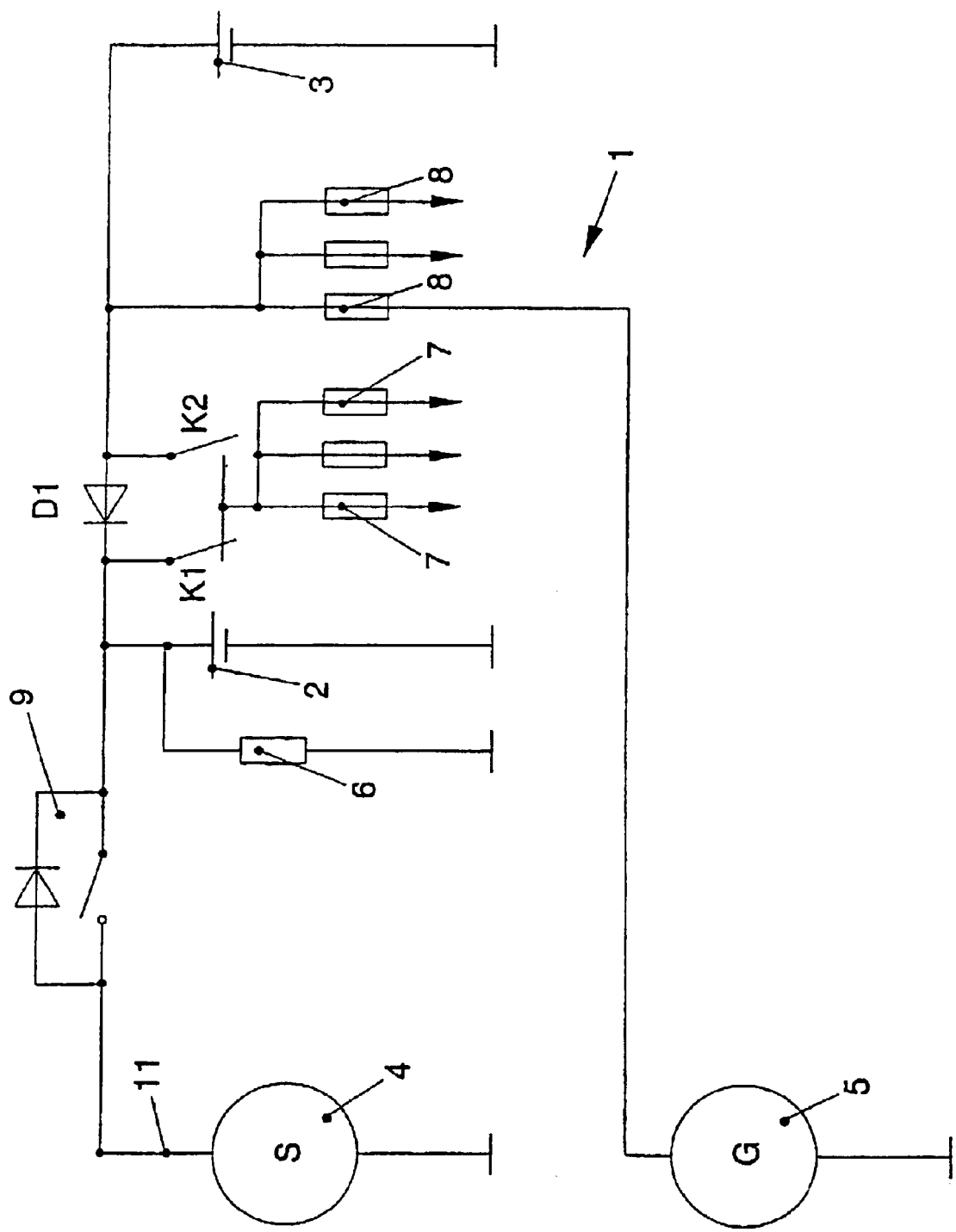
FIG. 2 is a schematic circuit diagram of a two-battery system having one electronic pole terminal.

An alternative example embodiment is illustrated in FIG. 2. In this case, electronic pole terminal 10 between starter 4 and electrical-system battery 3 is dispensed with, and relay K3 is replaced by a power diode D1. In this context, only starter battery 2 is used for starting. Diode D1 is conductive at a voltage difference greater than 0.7 V, and electrical-system battery 3 supporting the starting procedure, i.e., electrical-system battery 3 is only active during the starting procedure, if the starting procedure does not load starter battery 2. The switchover operation of start-relevant consumers 7 prior to or after the starting procedure is analogous to the switchover according to FIG. 1, when the starting procedure is implemented by start battery 2 or electrical-system battery 3, i.e., relay K2 is closed and relay K1 is opened. The forward diode voltage causes the charging voltage for starter battery 2 to be reduced by approximately 0.7 V. In order to compensate for this, diode D1 may be temporarily short-circuited by closing relay K1, when the state of the vehicle electrical system allows the starter battery to be charged. Diode D1 otherwise prevents starter battery 2 from discharging in favor of electrical-system battery 3.

Figure 3:
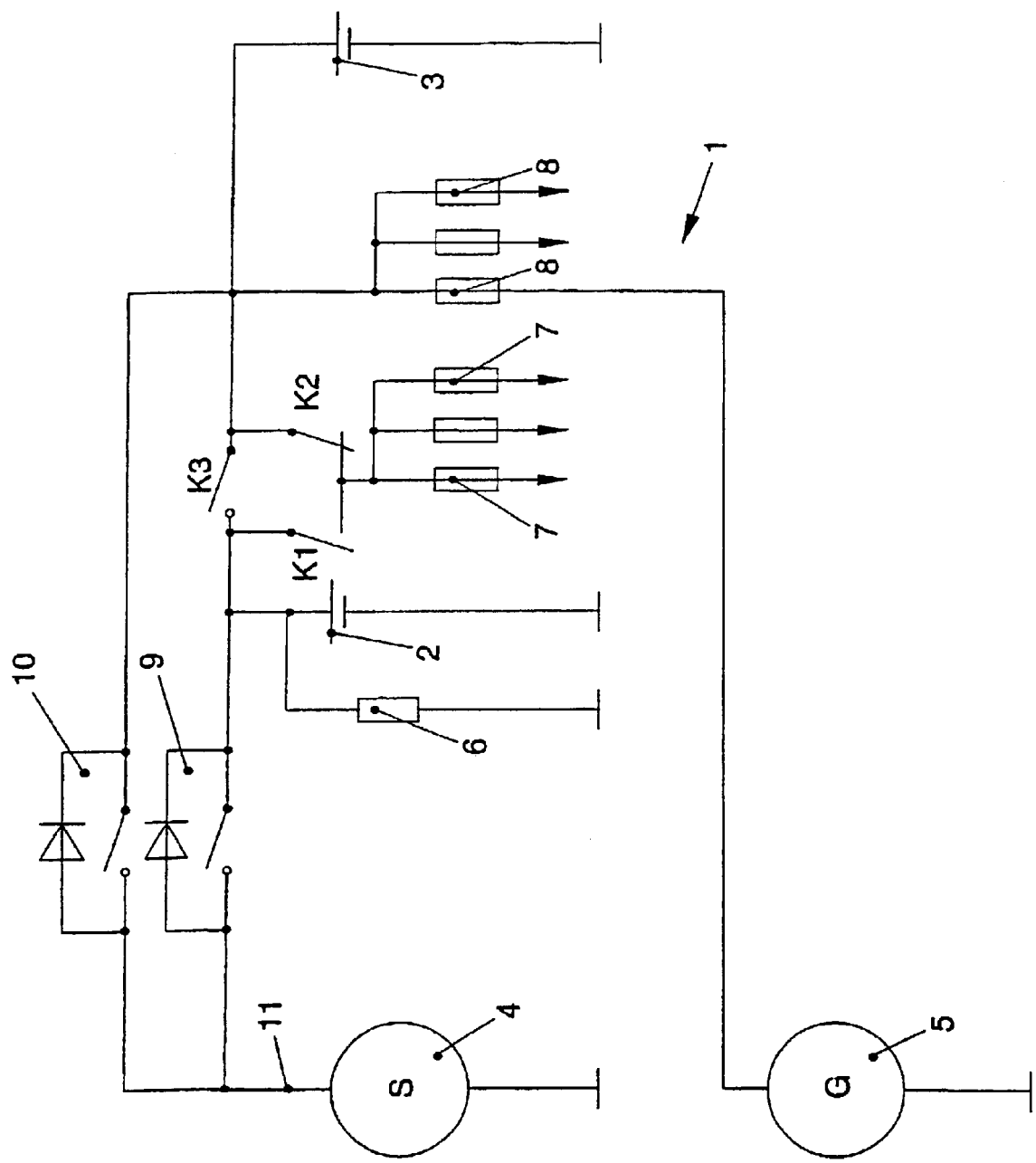
FIG. 3 is a schematic circuit diagram of a two-battery system in which the start-relevant consumers are assigned to the electrical-system battery in a standard manner.

An alternative example embodiment is illustrated in FIG. 3. The only difference from the circuit variant illustrated in FIG. 1 is that relay K1 is configured as a normally open contact and relay K2 is configured as a normally closed contact. Therefore, the start-relevant consumers are assigned to electrical-system battery 3 in the release state. As in the above-described example embodiments, the charge of the two batteries is determined prior to the initiation of the starting procedure, e.g., by having the electrical-system control unit take a voltage measurement. If this check test reveals that electrical-system battery 3 is sufficiently charged, then relays K1–K3 remain in their neutral position. However, if starter battery 2 is charged and electrical-system battery 3 is discharged, then start-relevant consumers 7 are switched to starter battery 2. To this end, relay K2 is opened and relay K1 is subsequently closed. This order may be adhered to, in order to prevent compensating currents from flowing between starter battery 2 and discharged electrical-system battery 3. If, however, both batteries are discharged, then there are principally two options. First of all, start-relevant consumers 7 may remain assigned to electrical-system battery 3. In this case, starter battery 2 is then recharged via the external starting-assistance point. When a starting attempt is made again, then charged starter battery 2 is detected by the electrical-system control unit, and start-relevant consumers 7 are switched to the starter battery. In the other case, start-relevant consumers 7 are assigned to starter battery 2 immediately after a failed starting attempt, so that the external start may immediately be performed by the external battery. In addition, start-relevant consumers 7 may always be assigned to the battery having a better state of charge.

In general, it is true for all of the circuit variants, that the charges of the batteries may only be evaluated and the possibly necessary interconnection configuration of the relays may only be realized and the possibly necessary switching of the relays may only be performed, when the motor is stationary. Therefore, an inhibit or lockout bit, which prevents a new charge classification, may be set after the switching or interconnection. This inhibit bit is only reset, when the electrical-system control unit is switched in a sleep mode, or terminal 15 is switched on and switched off.

After generator 5 is energized, all of relays K1–K3 are closed, the two open relays K1, K3 or K2, K3 being simultaneously closed so that starter battery 2 is charged, and the higher potential at the generator output ensuring that a directional flow of current occurs from the generator to electrical-system battery 3 and starter battery 2, and that compensation currents between the batteries are prevented. As long as starter battery 2 is sufficiently charged, i.e., as long as the state of the vehicle electrical system may load starter battery 2, relays K1 and K3 are opened in this order.

What is claim is:

1. A method for starting a motor vehicle using a two-battery system, the two-battery system including:
   a starter battery;
   an electrical-system battery;
   a starter;
   a plurality of electrical consumers, the electrical consumers including at least one start-relevant consumer and at least one electrical-system consumer;
   at least one first starter switch arranged between the starter and the starter battery;
   a second starter switch arranged between the starter and the electrical-system battery;
   a first electrically fully-blocking switch element arranged between the starter battery and the start-relevant consumers;
   a second electrically fully-blocking switch element arranged between the electrical-system batter and the start-relevant consumers; and
   an arrangement arranged between the starter battery and the electrical-system battery configured to prevent a current flow from the starter battery to the electrical-system battery and the electrical-system consumers;
   wherein the start-relevant consumers are configured to be assigned to a battery via the first electrically fully-blocking switch element and the second electrically fully-blocking switch element prior to initiation of a starting operation, by which the start-relevant consumers are to be powered during the starting operation, and wherein the start-relevant consumers are configured to be assigned to the electrical-system battery after termination of the starting operation, the first electrically fully-blocking switch element configured to be opened only after closing the second electrically fully-blocking switch element in accordance with essential switching operations of the first electrically fully-blocking switch element and the second electrically fully-blocking switch element after a starting phase;
   comprising the steps of:
   determining a charge state of the starter battery and the electrical-system battery prior to initiating the starting operation;
   assigning the start-relevant consumers to the battery by which the start-relevant consumers are to be powered during the starting operation in accordance with connection of the first electrically fully-blocking switch element and the second electrically fully-blocking switch element;
   switching the starter switching through from the assigned battery, the starter switches remaining switched through until high-load starting consumers are deactivated; and
   assigning the start-relevant consumer to the electrical-system battery after termination of the starting operation, the first electrically fully-blocking switch element opened only if the second fully-blocking switch element was previously closed, in accordance with essential switching operations of the first electrically fully-blocking switch element and the second electrically fully-blocking switch element after the starting phase.

2. The method according to claim 1, further comprising the steps of;
   assigning the start-relevant consumers to the starter battery in a rest state; and
   switching over the start-relevant consumers to the electrical-system battery prior to the starting phase only if the start-relevant consumers are only powerable by the electrical-system battery.

3. The method according to claim 1, further comprising the steps of:
   assigning the start-relevant consumers to the electrical-system battery in a rest state; and
   switching over the start-relevant consumers to the starter battery only if the start-relevant consumers are not powerable by the electrical-system battery.

4. The method according to claim 1, further comprising the step of always using both batteries for starting.

5. The method according to claim 1, further comprising the step of, prior to switching operation of the switching elements, adjusting a generator voltage of a controllable generator to a starter battery voltage to reduce switching load currents.

6. A two-battery system, comprising:
   a starter battery;
   an electrical-system battery;
   a starter;
   a plurality of electrical consumers, the electrical consumers including at least one start-relevant consumer and at least one electrical-system consumer;
   at least one first starter switch arranged between the starter and the starter battery;
   a second starter switch arranged between the starter and the electrical-system battery;
   a first electrically fully-blocking switch element arranged between the starter battery and the start-relevant consumers;

a second electrically fully-blocking switch element arranged between the electrical-system batter and the start-relevant consumers; and an arrangement arranged between the starter battery and the electrical-system battery configured to prevent a current flow from the starter battery to the electrical-system battery and the electrical-system consumers;

wherein the start-relevant consumers are configured to be assigned to a battery via the first electrically fully-blocking switch element and the second electrically fully-blocking switch element prior to initiation of a starting operation, by which the start-relevant consumers are to be powered during the starting operation, and wherein the start-relevant consumers are configured to be assigned to the electrical-system battery after termination of the starting operation, the first electrically fully-blocking switch element configured to be opened only after closing the second electrically fully-blocking switch element in accordance with essential switching operations of the first electrically fully-blocking switch element and the second electrically fully-blocking switch element after a starting phase.

7. The system according to claim 6, wherein each electrically fully-blocking switch element includes a relay.

8. The system according to claim 7, wherein a first relay includes an opening contact and a second relay includes a closing contact.

9. The system according to claim 6, wherein the first starter switch and the second starter switch include electronic pole terminals.

10. The system according to claim 9, wherein the electronic pole terminals include switchable power semiconductors.

11. The system according to claim 10, wherein the switchable power semiconductors include CMOS field-effect transistors.

12. The system according to claim 6, wherein the arrangement includes one of a diode and a relay.

13. The system according to claim 6, further comprising a tap assigned to the starter battery and configured to connect to an external battery.

14. The system according to claim 6, wherein high-load start-relevant consumers are permanently assigned to the starter battery.

15. The system according to claim 6, further comprising an electrical-system control unit configured to control at least one of the switch elements.

* * * * *